Dec. 6, 1966    J. KARPOVICH ET AL    3,290,256
FOAM BREAKING APPARATUS
Filed Sept. 2, 1964
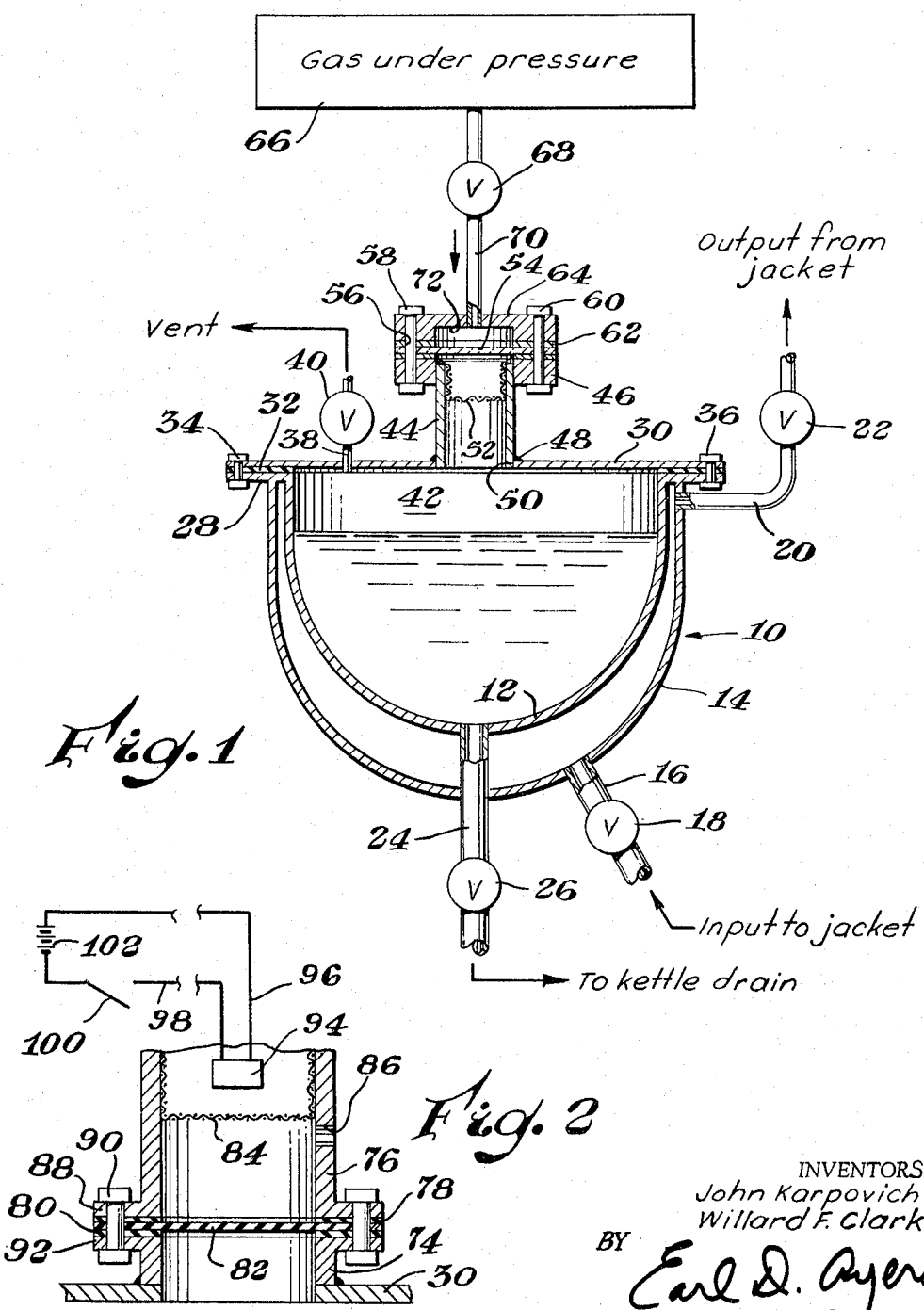
INVENTORS
John Karpovich
Willard F. Clark
BY
Earl D. Ayers
AGENT United States Patent Office 3,290,256
Patented Dec. 6, 1966

3,290,256
FOAM BREAKING APPARATUS
John Karpovich, Caro, and Willard F. Clark, Midland, Mich., assignors to The Dow Chemical Company, Midland, Mich., a corporation of Delaware
Filed Sept. 2, 1964, Ser. No. 393,850
5 Claims. (Cl. 252—361)

This invention relates to apparatus for breaking liquid foams and particularly to apparatus in which a shock wave is utilized to break so-called brittle foams.

In many chemical reactions, such as the making of some detergents, for example, excessive foaming of the materials is detrimental to the operation.

A need exists for a convenient means to break such foams when they occur within an enclosed reaction vessel.

Accordingly, a principal object of this invention is to provide an improved vessel having means coupled thereto for breaking foams within the vessel.

Another object of this invention is to provide improved means for breaking foams within a vessel.

A further object of this invention is to provide an improved means for breaking foams which does not interfere with the operation taking place within a reaction vessel.

In accordance with one embodiment of this invention there is provided, in a covered reaction vessel, a chamber whose volume is small in comparison with the non-liquid filled space in the vessel. The chamber is adapted to be pressurized and is separated from the interior of the vessel by a rupturable diaphragm.

Means are provided for pressurizing the chamber and rupturing the diaphragm to release a shock wave into the vessel which is directed at the foam, thereby breaking the foam.

The invention, as well as additional objects and advantages thereof, will best be understood when the following detailed description is read in connection with the accompanying drawing in which:

FIGURE 1 is a partially diagrammatical and partially side elevational view of apparatus in accordance with this invention, and FIGURE 2 is a fragmentary sectional view showing an alternative embodiment of this invention.

Referring to the drawing, and to FIGURE 1 in particular, there is shown a reaction vessel, indicated generally by the numeral 10, having an inner wall 12, an outer jacket wall 14, means including a conduit 16 and valve 18 for introducing a heating or cooling agent into the space, or so-called "jacket," between the inner wall 12 and the jacket wall 14, and means including a conduit 20 and valve 22 for facilitating the removal of the heating or cooling agent from the jacket of the vessel 10.

A conduit 24 having a valve 26 coupled thereto communicates with the interior of the vessel through the wall 12 to facilitate the entry or exit of material from the vessel.

The upper part of the vessel 10 has an outwardly extending flanged part 28 to which the upper end of each of the walls 12, 14 are sealed.

A cover 30 is sealed to the flanged part 28 by means of a suitable gasket 32 and a plurality of bolts which are disposed in an array adjacent to the perimeter of the flanged part (only the bolts 34, 36 being shown in the drawing).

A vent conduit 38 having a valve 40 coupled thereto communicates with the interior 42 of the vessel 10 through the cover 30.

A tubular element 44, having an outwardly extending flange 46 at the end thereof which is remote from the cover 30, is secured and sealed to the cover 30 by welds 48, communicating with the interior of the vessel through the bore 50 in the cover 30.

A screen 52, shaped to fit within the tubular element 44 and having an outwardly extending flanged part embedded in gasket material, is fitted into the upper end of the element 44.

A frangible disc 54, of glass, for example, having bores 56 near the periphery through which bolts 58, 60 (for example) extend, is placed across the upper part of the flanged part of the screen 52. A resilient gasket 62 is placed over the disc 54, and a closure element 64 having a cupped-out central part 72 facing the disc 54, is disposed on top of the gasket 62.

Bolts 58, 60, which extend through the closure element 64, gasket 62, disc 54, flanged part of the screen 52, and the flange 46, are tightened to seal the disc 54 to the tubular element 44.

A source 66 of gas under pressure is coupled to the closure element 64 through the valve 68 and conduit 70 which is sealed to the closure element 64 and communicates with the cupped-out part 72.

In operation, the vessel 10 is usually loaded with the component substances to be reacted with the cover removed. The cover is then secured to the vessel by means of the bolts 34, 36, for example. The heating or cooling agent is then introduced into or circulated through the jacket of the vessel through the conduit 16 or conduits 16 and 20.

As the reaction within the vessel proceeds (let it be assumed that a detergent of the alkyl benzyl sulfonate type is being made), foaming tends to occur.

When foaming occurs, gas from the source 66 (when nitrogen or a gas which is non-reactive with the materials in the vessel), is introduced into the chamber defined by the frangible disc 54 and the cupped-out part 72 of the closure member 64.

The pressure is increased in the above defined small space until the disc 54 ruptures, sending a shock wave down the tubular element 44 and into the vessel 10.

It has been found that such a shock wave effectively collapses so-called "brittle" foams of the type which occur in the manufacture of most household use types of detergents, such as the previously mentioned ABS type, for example.

The valve 68 is a type valve which closes again when the sudden drop in pressure occurs on the rupturing of the disc 54.

The screen 52 catches the pieces of the ruptured disc 54, preventing fragments of the disc from becoming mixed with the reacting materials in the vessel 10.

While glass diaphragms 54 have proven very successful in use, diaphragms made of rubber, metals such as nickel, stainless steel, for example, or many types of plastic materials have also been used successfully.

In one apparatus incorporating this invention the vessel 10 had a capacity of approximately 21 cubic feet. The diameter of the tubular element 44 was 3 inches, and the volume of the chamber into which gas was introduced under pressure was about 1.18 cubic inches. Gas pressure of the order of 250 p.s.i. was required to rupture the disc 54. The glass disc was about .079 inch thick.

While the source of gas under pressure may be a pressurized reservoir, a low pressure source of gas plus a positive displacement pump coupled to the conduit 70 may also be used.

It is realized that a valve may be installed in the tubular element 44 below the screen 52, thus permitting closing of the tubular element 44 while a new disc 54 is installed. Such an arrangement finds use when foams tend to build up repeatedly during a reaction within the vessel 10.

A second embodiment of this invention is shown in FIGURE 2, in which a tubular element 76 which corresponds to the tubular element 44 except for the vent aperture 86 and a flange 88 at its lower end. The screen 84 corresponds to screen 52 in FIGURE 1. The structure above the screen 84 may be the same as shown in FIGURE 1.

A short tubular element 74, having an outwardly extending flange 92 at its upper end, is sealed to the cover 30.

A flexible, acoustically compliant sheet 82 (such as polyethylene film .006 inch thick, for example) is stretched across the flange, sandwiched between gaskets 78, 80, and sealed between the flanges 88, 92 by means of the bolts 90.

In operation, as the frangible disc 54 breaks, the shock wave so produced travels down the tubular element 76, striking and passing through the compliant diaphragm 82 and into the foam in the vessel, breaking the foam.

Excess pressure build up in the tubular element 76 is vented through the bore 86, preventing damage to the diaphragm 82.

In event the shock wave producing apparatus is to be made portable, a cover plate (not shown) may be sealed over the flange 92, and the apparatus mounted on another vessel which is equipped with a tubular element 74.

In a slightly different mode of operation, a small explosive charge 94 is connected through leads 96, 98 and the switch 100 to a battery 102 disposed externally of the tubular element 76. The frangible disc may, if desired be dispensed with, as shown in FIGURE 2, and the shock wave created by detonation of the primed explosive charge 94. Alternatively, the explosive charge may serve as the source of pressurized gas (which is released on detonation of the charge).

While the invention has been described in connection with a simple embodiment, various modifications of the apparatus may be made without departing from the scope of the appended claims.

What is claimed is:

1. In a reaction vessel having walls and a cover defining a chamber wherein a chemical reaction takes place in which foaming of the reacting materials tends to occur, the improvement comprising a tubular element having end parts, one end part of said tubular element being secured and sealed to said cover and communicating with the interior of said vessel, a frangible disc, means for sealing said frangible disc across said tubular element adjacent to the other end part, said means for sealing comprising a flange, a pair of annular shaped gaskets, and a closure element having a dished part therein, said flange being sealed to said other end of said tubular element, said disc being placed across said flange and sandwiched between said gaskets, and said closure member is sealed against the side of said disc which is remote from said vessel, the dished part of said closure member facing said disc, and means for pressurizing said disc on the side thereof which is remote from said vessel to burst said disc, thereby forming a shock wave in said tubular element.

2. Apparatus in accordance with claim 1, wherein said means for pressurizing said disc is a reservoir of pressurized gas.

3. Apparatus in accordance with claim 2, wherein said gas is non-reactive with the contents of said vessel.

4. Apparatus in accordance with claim 1, wherein means are disposed across said tubular element for retaining within said tubular element fragments of said disc.

5. Apparatus in accordance with claim 4, wherein an acoustically compliant diaphragm is stretched across said tubular element between said frangible disc and said vessel and said tubular element has a vent aperture in its wall between said diaphragm and said frangible disc.

References Cited by the Examiner
UNITED STATES PATENTS

| | | | |
|---|---|---|---|
| 3,064,619 | 11/1962 | Fortman | 55—178 |
| 3,092,286 | 6/1963 | Duff | 137—68 X |
| 3,107,647 | 10/1963 | Soloff. | |
| 3,131,033 | 4/1964 | Volkenburgh | 137—68 X |
| 3,169,561 | 2/1965 | Berger et al. | |

OTHER REFERENCES

"Explosive Actuated Valves," by Maurice W. Connell, president, Conax Corporation, Buffalo, N.Y., pages 3–6.

NORMAN YUDKOFF, *Primary Examiner.*

J. SOFER, *Assistant Examiner.*